Dec. 17, 1929.  C. A. BORNMANN  1,740,279
FILM SHIFTER
Filed July 19, 1927
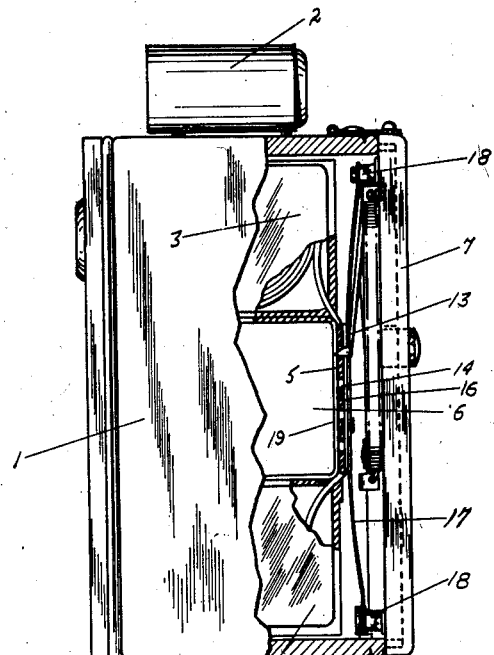
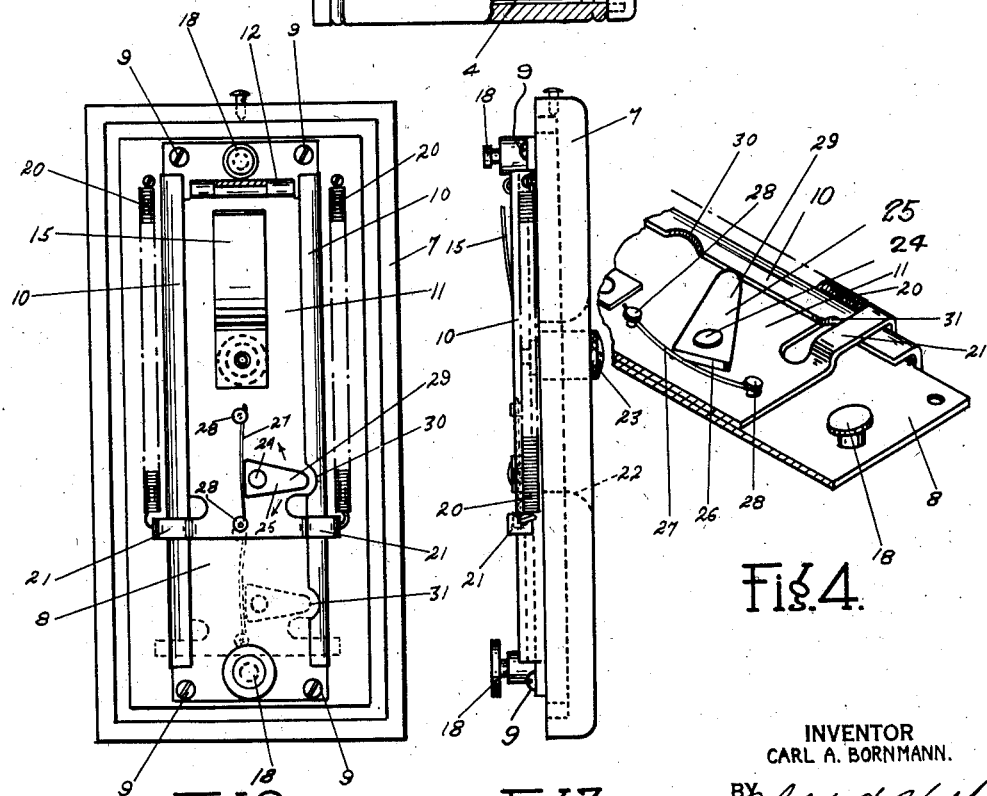
INVENTOR
CARL A. BORNMANN.
BY
ATTORNEY Patented Dec. 17, 1929

1,740,279

UNITED STATES PATENT OFFICE

CARL A. BORNMANN, OF BINGHAMTON, NEW YORK, ASSIGNOR, BY MESNE ASSIGNMENTS, TO AGFA ANSCO CORPORATION, OF BINGHAMTON, NEW YORK, A CORPORATION OF NEW YORK

FILM SHIFTER

Application filed July 19, 1927. Serial No. 206,967.

My invention relates generally to cameras and particularly to that type of camera wherein a strip of perforated film is wound from one coil to another past an exposure station in the camera, by means of a slidable claw mechanism which engages the perforations of the film to move the same in one direction. Sliding movement of such claw member is predetermined as to distance and a stop device provided for limiting such movement whereby a predetermined amount of film is moved upon each operation of the slide.

In such a camera it sometimes occurs through accident or inadvertence that the sliding film shifter is not moved its full distance before being returned for the next operation. Obviously, in such event, the section of film just exposed prior to such movement would not be moved completely out of the exposure area and the new section of film would not be moved completely into exposure position. The primary object of my invention is to provide means for preventing such partial movement of the part of the film shifter whereby the shifter must be moved its full distance at each operation.

Another object is to provide such a shifter device wherein the film shifter is prevented from return movement until it has completed its full film moving stroke.

A still further object is to provide such a device which is simple and automatic in operation and of few parts whereby very little cost is added to the construction of the camera.

Other objects and advantages in details of construction and operation will be apparent as the description proceeds, reference now being had to the figures of the accompanying drawing wherein like reference numerals indicate like parts.

In the drawing:—

Figure 1 is a side elevation of a camera equipped with my improved film shifter, certain parts being broken away to show the shifting mechanism.

Figure 2 is a plan view of the shifter mechanism with certain parts being removed to clearly illustrate the shifter device.

Figure 3 is a side view of the shifting mechanism.

Figure 4 is a detail perspective of the shifter device in locking position.

The reference numeral 1 refers to a camera provided with a view finder 2 and with film magazines 3 and 4. The film 5 is adapted to be moved from the upper magazine 3 downwardly past an exposure area 6 and into the film magazine 4. The removable back 7 of the camera is provided on its inner surface with a plate 8 suitably secured to the back as by the screws 9. The side edges of this plate 8 are turned inwardly to form the guiding flanges 10 for a slide 11 movable lengthwise of the plate.

Pivoted to the upper end of the slide 11 as at 12 is a claw member 13, the teeth of which are adapted to engage within the perforations 14 of the film 5 whereby to move such film downwardly when the slide and claw member are so moved. The leaf spring 15 is secured to the slide 11 and engages against the underside of the claw member 13 whereby to normally and resiliently hold such claw member outwardly into engagement with the film 5. As will be observed in Figure 1, the teeth of the claw member 13 are provided with straight lower edges and with bevelled upper edges. Obviously therefore when the slide 11 carrying the claw member is moved downwardly the straight edges will engage with the perforations of the film to move the film downwardly, whereas on the return movement of the slide upwardly, the bevelled upper edges of the claw will ride out of the perforations, ratchet like, and re-enter the perforations at the top of this stroke ready for another downward pull. A presser pad 16 carried by a spring 17 removably secured to posts 18 at the top and bottom of the plate 11, is adapted to normally engage the film 5 and hold it in flat engagement with the film guide 19 in the camera.

Coil springs 20 are anchored at their upper ends to the camera back 7 and at their lower ends attached to ears 21 extending laterally of the slide 11 at its lower end and curved upwardly over the guide flanges 10. Obviously, therefore, when the slide 11 is pulled downward, the spring 10 will return the slide and claw member upwardly to the starting position upon release by the operator.

The back 7 is provided with an elongated recess 22 through which projects a finger piece 23 secured to this slide 11. This provides moving means for moving such slide.

Loosely pivoted on the slide 11 as at 24 is a dog 25, one end 26 of which, adjacent the pivot 24, is straight and flat. A leaf spring 27 is anchored at both ends as at 28 and is at all times in engagement with the straight end 26 of the dog, thus normally holding such dog in the horizontal position shown in Figure 2. The opposite end 29 of the dog 25 is rounded and adapted to engage within either of the notches 30 or 31 located at spaced points on the lower end of the guide flange 10.

The parts just described are shown in full lines in Figure 2 in their normal position. Upon the downward movement of the slide 11, the rounded end 29 of the dog 25 will engage with the edge of the guide flange 10 which will rock such dog on its pivot as shown in Figure 4, against the tension of the leaf spring 27. Continued downward movement of the slide 11 carries with it the dog 25 sliding along the edge of the flange 10 until the downward stroke is completed, that is until the lower end of the slide 11 engages with the post 18 forming a stop therefor, whereupon the end 29 of the dog 25 will engage within the lower notch 31 in the guide flange and resume its normal horizontal position as shown in Figure 2 in dotted lines. After completing such movement, the operator releases the finger piece 23, whereupon the springs 20 will return the slide 11 upwardly to its initial position during which movement the dog 25 will be rocked in the opposite direction and again ride on the edge of the flange 10 until it reaches such normal upper position where it will again engage within the notch 30.

Assuming however that the operator in moving the slide 11 downwardly to shift the film 5 fails to complete the entire movement downward and release the slide before it has moved the film the required distance, it will be clear that with the dog 25 in the position shown in Figure 4, that is intermediate the notches 30 and 31, it will be impossible for the springs 20 to return the slide into the upper normal position, due to the frictional engagement between the nose 29 of the dog and the edge of the guide flange 10, the flat spring 27 exerting tension on the dog to maintain such engagement. The operator knows therefore that he must move the slide 11 still further downwardly and finish the shifting of the film before the slide will return into position for moving the next section of film. In fact this pivoted dog 29 forms a positive lock for the shifting mechanism until it has completed its downward movement and the dog 25 engaged within the lower notch 31 whereupon the slide may be returned.

Of course, many changes may be made in details of construction and operation without departing from the spirit and scope of my invention. I do not limit myself therefore to the exact structure shown and described, other than by the appended claims.

I claim:—

1. In combination, in a camera, a reciprocating film shifter, means for moving said shifter in one direction, means for returning said shifter to starting position, and means for preventing the return of said shifter before completion of the first named movement.

2. In combination, in a camera, a reciprocating film shifter having limited movement, means for moving said shifter in one direction, means for automatically returning said shifter to starting position, and means for preventing the return of said shifter before the completion of the first named movement.

3. In combination, in a camera, a reciprocating film shifter, stops for limiting the movement of said shifter in both directions, manual means for moving said shifter to one of said stops, means for automatically returning said shifter to the other of said stops, and means for preventing such return of said shifter before the completion of the first named movement.

4. In combination, in a camera, a reciprocating film shifter comprising a slide carrying a claw for engaging a film to move it in one direction, a guideway for said slide and means on said slide cooperating with said guideway for locking said slide against movement in one direction in certain positions of said slide.

5. In combination, in a camera, a reciprocating film shifter, comprising a slide carrying a claw for moving a film in one direction, a guideway for said slide, and a pivoted safety device on said slide and cooperating with said guideway whereby movement of said slide in one direction is prevented in certain positions of said slide.

6. In combination, in a camera, a guideway, a reciprocating film shifter, comprising a slide carrying a claw engageable with a film to move it in one direction, the movement of said slide being limited in both directions and a pawl pivoted on said slide and having frictional engagement with said guideway between said limits of movement.

7. In combination, in a camera, a guideway, a reciprocating film shifter, comprising a slide carrying a claw engageable with a film to move it in one direction, the movement of said slide being limited in both directions and a pawl pivoted on said slide and having frictional engagement with said guideway between said limits of movement, said guideway having notches at the limits of movement of said slide whereby to permit said pawl to rock on its pivot free of said guideway.

CARL A. BORNMANN.